Figure 1:
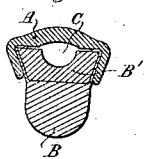

(No Model.)

W. E. BARTLETT.
WHEEL.

No. 434,974.  Patented Aug. 26, 1890.

Witnesses.
N. H. Smith
C. W. Brooke

Inventor
William Erskine Bartlett
By his Attorneys,
Baldwin Davidson & Wright

United States Patent Office.

WILLIAM E. BARTLETT, OF EDINBURGH, SCOTLAND.

WHEEL.

SPECIFICATION forming part of Letters Patent No. 434,974, dated August 26, 1890.

Application filed April 21, 1890. Serial No. 348,869. (No model.)

*To all whom it may concern:*

Be it known that I, WILLIAM ERSKINE BARTLETT, rubber manufacturer, a citizen of the United States, residing at 21 Buckingham Terrace, Edinburgh, Scotland, have invented a certain new and useful Wheel, of which the following is a specification.

These improvements relate to the rubber tires used in vehicles and to the metal tires over which they are placed; and they consist in constructing them so that the rubber tires shall be held to the metal ones without the use of cement and such like adhesives, and with little or no stretch or tension, thereby eradicating or minimizing the injurious effects incidental to rubber tires put on under tension—an unavoidable condition when cement is used. In every road sharp stones and other materials are more or less prevalent, and it is impossible to prevent scratches or cuts in the rubber tires therefrom, and in respect that a scratch or cut in rubber under tension is very liable to develop into a deep cut or complete fracture, the importance of my improvement becomes manifest. Not only will durability of the rubber tires be increased and the trouble of cementing the stretched rubber tires to the metal ones be saved, but greater facility of mounting the rubber tires on the wheels will be obtained. In carrying out these improvements I form a rubber tire with about three-fourths of its cross-section circular, and the remaining part, or part in combination with the metal tire, is expanded into a dovetail shape, which is pressed into a dovetail groove in the metal tire and so held to the wheel.

To secure cushioning to the wheel with as little rubber as possible I groove the rubber forming the dovetail of the tire to form an air space or chamber in the middle thereof between it and the metal tire, which may be flat under the dovetail portion of the rubber tire, or it may be also grooved, so as to increase the air space or chamber. Another function of the groove in the rubber is to get greater lateral pressure from the rubber against the flanges forming the groove in the metal tires at the part which is on the ground carrying the load, thus providing against the shifting of the rubber at the time when and place where any disturbance of the rubber takes place. The hollow space or air-chamber may be got by grooving one or other, or both, the rubber and metal tires. The dovetailed extension of the rubber tires and the corresponding dovetailed grooves in the metal tires over which they are placed are obtained by processes well known to rubber and metal manufacturers, respectively. I prefer to form the dovetailed portion of the rubber tire of a stiffer quality of rubber than the other part.

In order to give a better hold on the ground, I sometimes make the tread of the tire double.

Figure 2:

In the drawings, Figures 1 and 2 show sections of tires made according to my invention.

A is the rim of the wheel. The rubber tire is made of two sorts of material, the tread B being soft, while the upper part B' is hard.

C is an air-space formed in the tire.

In Fig. 2 the tread B is made double, as shown.

What I claim is—

1. The combination of a metal rim having a dovetailed trough and a tire having a curved soft-rubber periphery and a hard-rubber dovetailed inner portion secured snugly within the trough of the rim, said hard inner portion having a groove to form an air-space.

2. A wheel whose rim is in the form of a trough with inclined sides, between which is inserted a tire, partly of soft rubber and partly of harder rubber vulcanized together, the latter (which forms the part of the tire held in the metal trough) being of dovetail form with an air-space between its two sides and the former (or soft-rubber part of the elastic tire) being entirely outside the metal trough, semicircular in section on its bearing-face, and connected with the hard-rubber part without any ridge or shoulder.

3. A wheel whose rim is in the form of a trough with inclined sides, between which is inserted a tire, partly of soft rubber and partly of harder rubber vulcanized together, the latter (which forms the part of the tire held in the metal trough) being of dovetail form with an air-space between its two sides and the former (or soft-rubber part of the elastic tire) being entirely outside the metal trough, semicircular in section on its bearing-face, and connected with the hard-rubber part without any ridge or shoulder, said soft-rubber outer portion being centrally divided to form a double tread.

4. The combination of a metal rim having a dovetailed trough and a tire having a periphery of soft rubber centrally divided to form a double tread and an inner portion of hard rubber secured with the trough of the rim.

WM. E. BARTLETT.

Witnesses:
W. FIRTH,
    Gravestone Road, Edinburgh,
ALEX LAWSON,
    11 Cluny Avenue, Edinburgh.